United States Patent
Li et al.

(10) Patent No.: US 11,177,648 B2
(45) Date of Patent: Nov. 16, 2021

(54) SYSTEM AND METHOD FOR COMPACT MOTOR CONTROL WITH REDUNDANT POWER STRUCTURES

(71) Applicant: Eaton Intelligent Power Limited, Dubin (IE)

(72) Inventors: Huaqiang Li, Menomonee Falls, WI (US); Joseph Paul Uphaus, Whitefish Bay, WI (US)

(73) Assignee: Eaton Intelligent Power Limited, Dublin (IE)

( * ) Notice: Subject to any disclaimer, the term of this patent is extended or adjusted under 35 U.S.C. 154(b) by 451 days.

(21) Appl. No.: 15/854,129

(22) Filed: Dec. 26, 2017

(65) Prior Publication Data

US 2019/0199086 A1    Jun. 27, 2019

(51) Int. Cl.
*H02H 7/122*    (2006.01)
*H02M 7/5387*    (2007.01)
(Continued)

(52) U.S. Cl.
CPC ............. *H02H 7/1225* (2013.01); *H02J 9/06* (2013.01); *H02M 1/32* (2013.01); *H02M 5/4585* (2013.01);
(Continued)

(58) Field of Classification Search
CPC ............... H02P 7/2913; H02H 7/1225; H02M 7/53871; H02M 5/4585; H02M 1/32
(Continued)

(56) References Cited

U.S. PATENT DOCUMENTS 4,356,525 A * 10/1982 Kornrumpf ............ H02H 9/002
  361/4
4,673,825 A *  6/1987 Raddi .................... H02J 9/062
  307/66

(Continued)

FOREIGN PATENT DOCUMENTS

CN    104065318 A    9/2014
EP      2408099 A2    1/2012

OTHER PUBLICATIONS

Acheson, "Redundant Drives", HPAC Engineering, Nov. 1, 2010, pp. 1-3.
(Continued)

*Primary Examiner* — Eduardo Colon Santana
*Assistant Examiner* — Devon A Joseph
(74) *Attorney, Agent, or Firm* — DiBerardino McGovern IP Group LLC

(57) ABSTRACT

A compact motor control system for selectively controlling power from a power source to a load includes a motor switching assembly having a solid state contactor with a plurality of solid state switches. The motor switching assembly also includes at least one direct current (DC) link coupled to the solid state contactor and redundant first and second inverters coupled to the at least one DC link. The motor switching assembly further includes a first relay coupled between the solid state contactor and an input of the inverter and a second relay coupled between the solid state contactor and an input of the second inverter. In addition, the motor control system includes a control system programmed to control the motor switching assembly to selectively supply power to the load from the power source.

21 Claims, 10 Drawing Sheets

(51) Int. Cl.

| | | |
|---|---|---|
| *H02M 5/458* | (2006.01) | |
| *H02M 1/32* | (2007.01) | |
| *H02P 7/29* | (2016.01) | |
| *H02M 7/00* | (2006.01) | |
| *H02M 7/493* | (2007.01) | |
| *H02P 27/04* | (2016.01) | |
| *H02J 9/06* | (2006.01) | |
| *H02P 1/02* | (2006.01) | |

(52) U.S. Cl.
 CPC ........... *H02M 7/003* (2013.01); *H02M 7/493* (2013.01); *H02M 7/53871* (2013.01); *H02P 1/029* (2013.01); *H02P 7/2913* (2013.01); *H02P 27/04* (2013.01); *H02M 1/325* (2021.05); *H02M 5/458* (2013.01)

(58) Field of Classification Search
 USPC .......................................................... 318/799
 See application file for complete search history.

(56) References Cited

U.S. PATENT DOCUMENTS

| | | | | |
|---|---|---|---|---|
| 5,824,990 A * | 10/1998 | Geissler | ................... | B23K 9/10 |
| | | | | 219/130.21 |
| 5,894,415 A * | 4/1999 | Habegger | ............ | H02J 7/0031 |
| | | | | 363/65 |
| 7,224,557 B2 * | 5/2007 | Kinsella | ................... | H01H 9/40 |
| | | | | 361/2 |
| 7,719,219 B2 | 5/2010 | Baumann et al. | | |
| 7,940,018 B2 * | 5/2011 | Yonemori | ................ | B60K 6/46 |
| | | | | 318/376 |
| 8,014,110 B2 | 9/2011 | Schnetzka et al. | | |
| 8,228,019 B2 | 7/2012 | Higuchi et al. | | |
| 8,587,240 B2 * | 11/2013 | Wolfe | ........................ | H02P 1/28 |
| | | | | 318/430 |
| 8,693,170 B2 | 4/2014 | Barreau et al. | | |
| 9,018,882 B2 | 4/2015 | Mack et al. | | |
| 9,641,095 B1 * | 5/2017 | Wild | ................. | H02M 3/33592 |
| 2004/0240244 A1 * | 12/2004 | Yamamoto | .............. | H02J 9/062 |
| | | | | 363/131 |
| 2004/0262997 A1 * | 12/2004 | Gull | ........................ | H02J 3/005 |
| | | | | 307/64 |
| 2005/0057213 A1 * | 3/2005 | Williams | .................. | H02P 4/00 |
| | | | | 318/811 |
| 2005/0189889 A1 * | 9/2005 | Wirtz | ................... | H05K 7/1432 |
| | | | | 318/105 |
| 2005/0225270 A1 | 10/2005 | Schnetzka et al. | | |
| 2007/0035261 A1 * | 2/2007 | Amorino | .................... | H02P 5/46 |
| | | | | 318/109 |
| 2008/0094771 A1 * | 4/2008 | Messersmith | .......... | H01H 9/542 |
| | | | | 361/100 |
| 2008/0103632 A1 * | 5/2008 | Saban | ...................... | H02K 21/48 |
| | | | | 700/286 |
| 2009/0045782 A1 * | 2/2009 | Datta | ....................... | H02M 7/49 |
| | | | | 322/17 |
| 2010/0102636 A1 | 4/2010 | Tracy et al. | | |
| 2012/0044731 A1 * | 2/2012 | Wirth | .................... | H02M 7/493 |
| | | | | 363/132 |
| 2012/0098261 A1 * | 4/2012 | Rozman | ................ | F02N 11/006 |
| | | | | 290/31 |
| 2013/0020975 A1 * | 1/2013 | Wolfe | ........................ | H02P 1/28 |
| | | | | 318/430 |
| 2013/0076126 A1 * | 3/2013 | Hashimoto | ............. | B60L 50/61 |
| | | | | 307/9.1 |
| 2013/0099567 A1 | 4/2013 | Pfitzer | | |
| 2013/0235494 A1 * | 9/2013 | Holce | ...................... | H02H 3/08 |
| | | | | 361/31 |
| 2014/0244051 A1 * | 8/2014 | Rollins | ................. | F04D 19/002 |
| | | | | 700/282 |
| 2015/0035286 A1 * | 2/2015 | Stephens | ................ | B63H 25/42 |
| | | | | 290/4 A |
| 2015/0171733 A1 * | 6/2015 | Zargari | .................. | H02M 1/10 |
| | | | | 307/52 |
| 2015/0222207 A1 * | 8/2015 | Matsushita | ............... | H02P 3/18 |
| | | | | 318/376 |
| 2015/0283911 A1 * | 10/2015 | Ambrosio | ............... | H02J 7/345 |
| | | | | 307/10.1 |
| 2016/0268797 A1 * | 9/2016 | Li | ........................... | H02M 1/32 |
| 2017/0077748 A1 * | 3/2017 | Johnson, Jr. | ............ | H02J 3/381 |
| 2017/0110991 A1 * | 4/2017 | Frampton | ................. | H02P 6/16 |
| 2018/0167002 A1 * | 6/2018 | Frampton | ............. | H02J 7/1492 |
| 2019/0126760 A1 * | 5/2019 | Najmabadi | ............. | B60L 53/12 |

OTHER PUBLICATIONS

"PowerGate 'H' HVAC Bypass Controller," Mitsubishi Electric Corporation, Feb. 2, 2017, pp. 1-2, https://us.mitsubishielectric.com/fa/en/solutions/industries/hvac/powergatehseries.

* cited by examiner

SYSTEM AND METHOD FOR COMPACT MOTOR CONTROL WITH REDUNDANT POWER STRUCTURES

BACKGROUND OF THE INVENTION

The present invention relates generally to motor control systems and, more particularly, to a system and method for compact and reliable motor control using redundant power structures/converters.

One type of system commonly used in industry that performs power conversion is an adjustable speed drive, also known as a variable frequency drive (VFD). A VFD is an industrial control device that provides for variable frequency, variable voltage operation of a driven system, such as an AC induction motor. In use, a VFD is often provided as part of an overall control and protection assembly that includes the VFD as well as an arrangement of input/output fuses, disconnects, circuit breakers, contactors, or other protection devices, controllers, filters, and sensors.

As a general rule, the VFD and associated protection and control devices are provided as discrete components having their own housings, with the arrangement of components being housed within an enclosure. The arrangement of components are fixed to a support within the enclosure, such as a DIN rail for example, with wiring being provided between the components to provide for electrical connectivity and/or communication therebetween. Thus, when assembled as a unit, the overall collection of components and the enclosure required to house them become quite large and bulky. In addition, the amount of wiring required between the components is often excessive, which can hinder accessibility to the components and increase installation time, cost, power loss, and potential failure due to the large number of wires and wire connections.

VFDs are implemented in different ways in different applications depending on the importance of the load being driven by the VFD. In order to ensure an uninterrupted operation in critical applications, a dual-VFD system may be used to drive a load. A dual-VFD system includes two VFDs that are each connected to the load in parallel with each other such that each VFD may be operated to drive the load. One of the VFDs will drive the load at a time, and if the load-driving VFD fails, control of the load is automatically transferred to the other VFD. However, including multiple VFDs in a system is expensive and adds an additional component to an already complex system having a large number of components that need to be wired, as explained above.

A more cost-effective option that may be used in less critical applications is a single-VFD bypass system. In a single-VFD bypass system, a VFD is coupled to a load in parallel with a bypass assembly that includes one or more of a bypass contactor and soft starter that provide alternate control paths or mechanisms for controlling the driven system. It is known to use a traditional bypass assembly as a solution to provide system redundancy in case of VFD failure, or for other scenarios, such as, for example, performing VFD maintenance and running the motor at full speed directly from the utility for higher system efficiency. As indicated above and shown in prior art FIG. 1, an existing bypass assembly 1 is added to a VFD installation as one or more additional discrete components with a separate input contactor 2, bypass contactor 4, silicon-controlled rectifier (SCR)-based soft starter 6, and output/overload relay 8 typically being provided. However, the resulting combined installation is expensive, complicated, bulky, and frequently impractical in many applications and/or installation sites.

In addition, the prior art bypass contactors simply provide a direct connection between the power source and load without the functionality of the VFD. When the bypass contactor is closed to bypass the VFD, the system controller is not able to control the voltage and current received by the motor. In other words, unlike the VFD, the bypass provided is not capable of controlling the speed of a motor. Therefore, the bypass limits or restricts operation of the motor and does not provide for operational flexibility.

It would therefore be desirable to provide a motor control system whose footprint is minimized and that requires less or no wiring between components thereof, so as to reduce size, cost, and complexity of the motor control system. It would further be desirable for such a motor control system to include redundant power structures that provide more functionality, flexibility, and reliability than traditional systems.

BRIEF DESCRIPTION OF THE INVENTION

Embodiments of the present invention provide a system and method for compact motor control with redundant power structures that provide increased reliability and functionality.

In accordance with one aspect of the invention, a motor control system for selectively controlling power from a power source to a load includes a motor switching assembly having a solid state contactor with a plurality of solid state switches. The motor switching assembly also includes at least one direct current (DC) link coupled to the solid state contactor and first and second inverters coupled to the at least one DC link. The motor switching assembly further includes a first relay coupled between the solid state contactor and an input of the first inverter and a second relay coupled between the solid state contactor and an input of the second inverter. In addition, the motor control system includes a control system programmed to control the motor switching assembly to selectively supply power to the load from the power source.

In accordance with another aspect of the invention, a controller-implemented method of operating a motor control system having a solid state contactor, at least one DC link coupled to the solid state contactor, first and second power converters coupled to the at least one DC link, and first and second relays coupled between the solid state contactor and respective first and second power converters includes controlling the solid state contactor in a conducting mode. The method also includes closing the first relay to supply power to the first power converter and operating the first power converter to drive a motor. In addition, the method includes transitioning from operating the first power converter to operating the second power converter by disabling the first power converter, opening the first relay, closing the second relay, and operating the second power converter to drive the motor.

In accordance with yet another aspect of the invention, a motor switching assembly includes a first power converter, a second power converter coupled in parallel with the first power converter, and a solid state contactor positioned upstream from the first and second power converters. The motor switching assembly further includes a first relay positioned between the solid state contactor and the first power converter and a second relay positioned between the solid state contactor and the second power converter.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to a motor control system having a motor switching assembly or module and method of operating the motor switching assembly. The motor switching assembly includes a solid state input contactor that receives an input power from a source such as, for example, a utility. The solid state contactor replaces a number of discrete protection and control components typically found in motor control systems and provides more advanced controls in the motor control system including power flow control and protection. The solid state contactor is controlled by a control system or controller to supply power to at least two different motor drivers separated from the solid state contactor and one another via respective relays. The controller activates the different relays in order to control which driver receives power from the solid state contactor to power the motor. The controller may select which driver or drivers to activate based on a schedule, a driver failure, temperature thresholds, or other monitored conditions.

While embodiments of the invention are described and illustrated below as being directed to a motor control system with a multi-functional solid state contactor and redundant motor drivers, it is recognized that embodiments of the invention are not meant to be limited to such circuits. That is, embodiments of the invention may be extended more generally to power/energy conversion circuits of varying constructions and implementations such as, for example, motor starters, motor control centers, and power/energy conversion circuits for driving non-motor loads. Accordingly, the following discussion is not meant to limit the scope of the invention.

Figure 1:
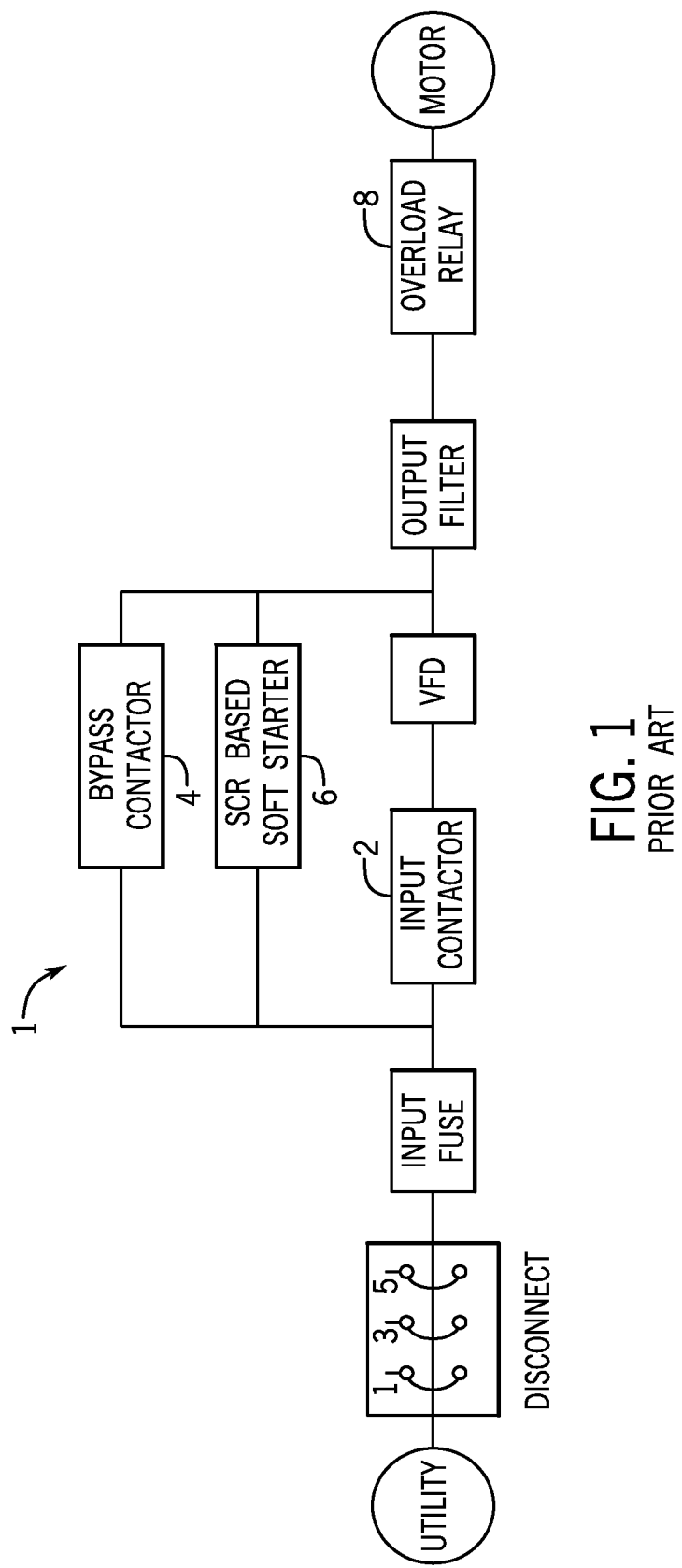
FIG. 1 is a block diagram of a motor control system having a bypass assembly included therein, as known in the prior art.
Figure 2:
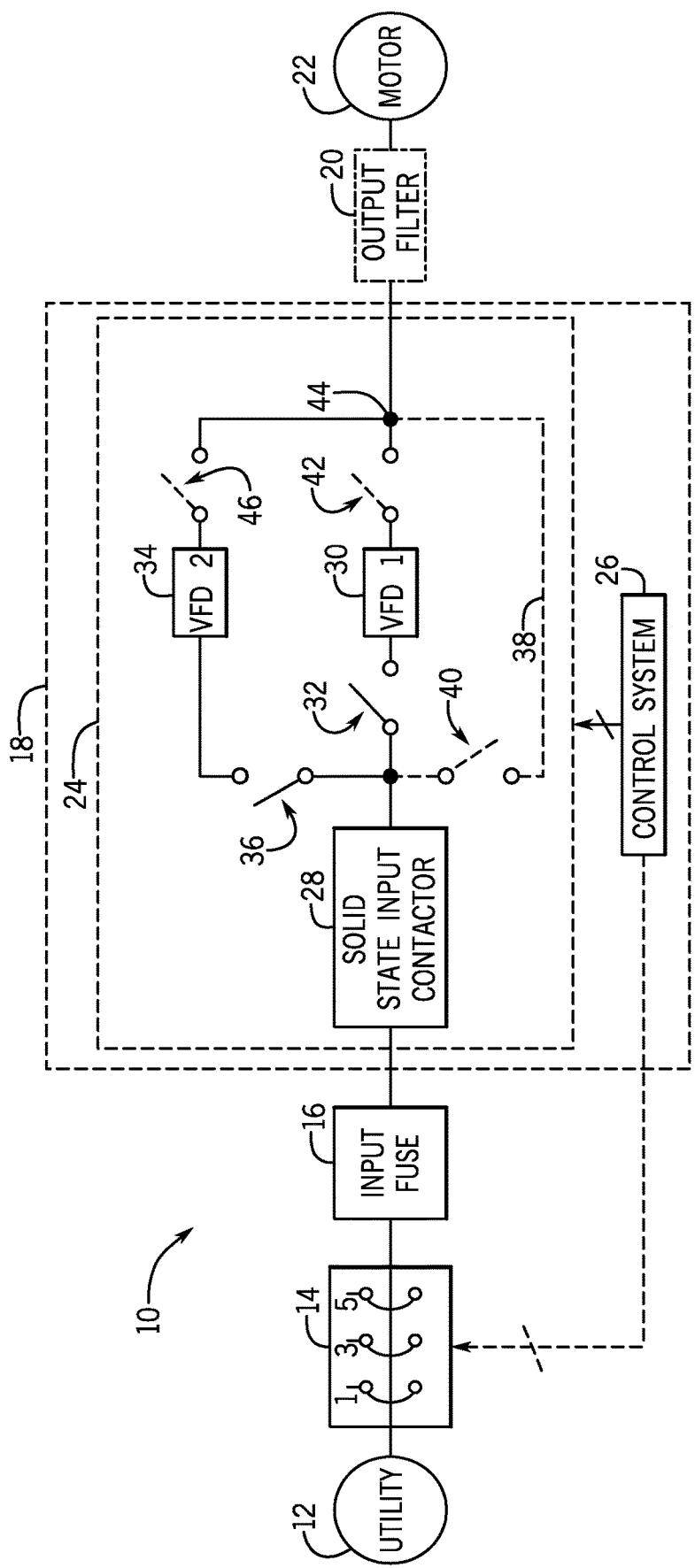
FIG. 2 is a block diagram of a power system including a motor control system having a motor switching assembly with an integrated solid state contactor and redundant VFDs, according to an embodiment of the invention.

Referring to FIG. 2, a block diagram of a power system 10 is shown, according to an embodiment of the invention. Power system 10 includes a power source 12, such as from a utility, for example, coupled to a disconnect contactor or switch 14 that may be operated in a closed or On position in which power from utility 12 is allowed to flow therethrough and an open or Off position in which power may not flow therethrough. Power system 10 also includes an input fuse 16 coupled to disconnect switch 14. Input fuse 16 provides overcurrent protection by interrupting the current from utility 12 if the level of current becomes too high. Input fuse 16 is coupled to a motor control system 18, which is then coupled to an optional output filter 20 that helps protect a load 22, such as, for example, a motor, from the harmful effects of reflected waves due to impedance mismatch and prevent motor failure due to insulation failure, overheating, and noise.

Motor control system 18 includes a motor switching assembly or module 24 and a control system or controller 26 that provides control signals to various components of motor switching assembly 24. In some embodiments, controller 26 optionally controls the position of disconnect switch 14 as well. In other embodiments, motor control system 18 may include multiple controllers that each provide control signals to one or more select components of motor switching assembly 24.

Motor switching assembly 24 includes a solid state input contactor 28 coupled to a first power converter 30 via a first input relay 32 and to a second power converter 34 via a second input relay 36. In the embodiment of FIG. 2, first and second power converters 30, 34 are VFDs (shown in FIG. 2 as "VFD 1" and "VFD 2," respectively, and hereinafter referred to as "first VFD 30" and "second VFD 34," respectively). In various embodiments, motor switching assembly 24 may also include one or more additional VFDs in parallel with first and second VFDs 30, 34—with an input relay coupled between each additional VFD and contactor 28. In yet another alternative configuration, motor switching assembly 24 may include an optional bypass 38 and associated bypass relay 40.

Each of first and second input relays 32, 36 may be operated in a closed or On position/state in which solid state contactor 28 may supply power to respective first and second VFDs 30, 34 and an open or Off position/state in which first and second VFDs 30, 34 are separated from solid state contactor 28 with galvanic isolation. The output of each of first and second VFDs 30, 34 is electrically coupled to motor 22 so that each of first and second VFDs 30, 34 may supply power to motor 22, which may be used to drive fans, conveyors, pumps, and other electromechanical devices.

In some embodiments, motor switching assembly 24 optionally includes first and second output relays 42, 46 coupled proximate the outputs of first and second VFDs 30, 34, respectively. Each of first and second output relays 42, 46 may be operated in On and Off positions in a similar manner as first and second input relays 32, 36. When both first input relay 32 and first output relay 42 are in the Off position, first VFD 30 is electrically isolated from solid state contactor 28 and motor 22. When both second input relay 36 and second output relay 46 are in the Off position, second VFD 34 is electrically isolated from solid state contactor 28. Thus, first and second VFDs 30, 34 may be independently isolated from solid state contactor 28 and motor 22 using first and second input relays 32, 36 and first and second output relays 42, 46. The independent isolation advantageously allows for only one of first and second VFDs 30, 34 to be electrically isolated upon detection of a failure or so that it can be repaired or replaced. In other embodiments, first and second output relays 42, 46 may be omitted and replaced by an optional single output relay (not shown) positioned between node 44 and motor 22.

Figure 3:
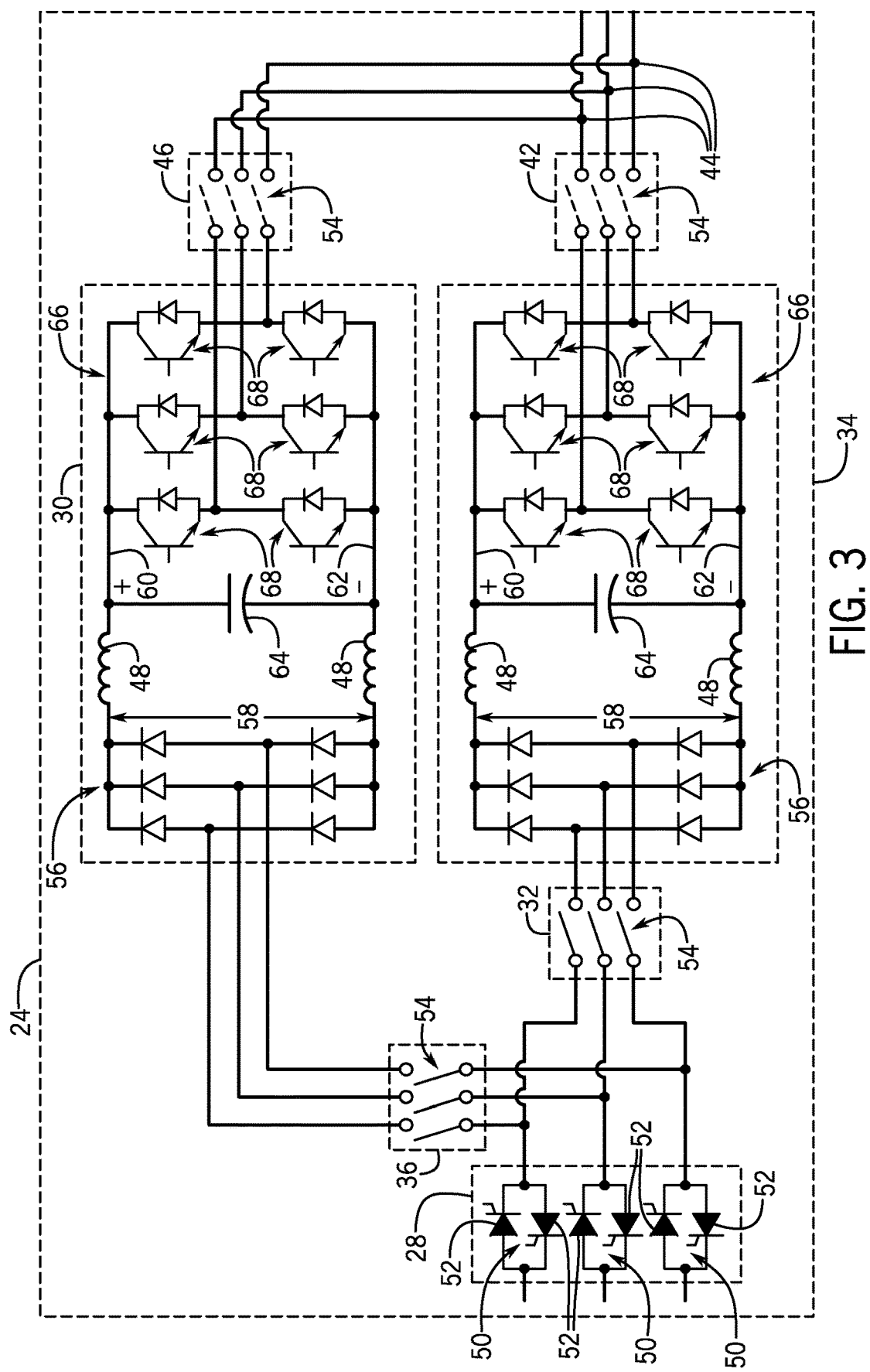
FIG. 3 is a schematic of a motor switching assembly that may be implemented in the motor control system of FIG. 2, according to an embodiment of the invention.

Referring now to FIG. 3, an exemplary structure/configuration of motor switching assembly 24 of FIG. 2 is shown, according to an embodiment of the invention—including the structure/configuration of VFDs 30, 34, solid-state contactor 28, and relays 32, 36, 42, and 46. In the embodiment of FIG. 3, solid state input contactor 28 includes a switching device 50 on each supply line of the three-phase input. In an exemplary embodiment each switching device 50 is formed of a pair of inverse parallel or anti-parallel switches 52, such as solid-state switches in the form of silicon controlled rectifiers (SCRs) or thyristors that control the current flow through switching device under the control of controller 26 of FIG. 2—hereinafter referred to as SCRs 52. While each phase is shown as including a pair of SCRs 52, it is recognized that other suitable solid-state switches could instead be employed—including insulated-gate bipolar transistors (IGBTs), bipolar junction transistors (BJTs), integrated gate-commutated thyristors (IGCTs), gate turn-off (GTO) thyristors, or metal-oxide semiconductor field-effect transistors (MOSFETs), as non-limiting examples.

Since contactor 28 is formed of solid state devices 52 as opposed to a traditional electromechanical contactor, each solid state device 52 of contactor 28 can be controlled by controller 26 to regulate the amount of the line voltage and current present in motor switching assembly 24. In other words, controller 26 may control contactor 28 to selectively conduct and block the flow of current therethrough. This control over the line voltage and current enables controller 26 to be powered by the voltage and current from utility 12 as opposed to a standalone power supply that might have been necessary to provide a more stable source of power to controller 26. SCRs 52 further allow controller 26 to control solid state contactor 28 as an overload relay based on overvoltage and/or overcurrent conditions present in power system 10 (FIG. 2), as measured by various sensors (not shown). Additionally, the configuration of contactor 28 may allow controller 26 to control contactor 28 to act as a soft starter.

In the three phase motor switching assembly 24 illustrated in FIG. 3, each of first and second input relays 32, 36 and optional first and second output relays 42, 46 include three electromechanical or solid state switches 54, such as, for example, IGBTs or MOSFETs, which have a rating lower than a full motor voltage and lower than inrush current ratings. That is, as the solid-state contactor 28 upstream from relays 32, 36, 42, 46 functions to selectively conduct and block the flow of current therethrough, switches 54 may be switched under reduced voltage and current stress levels, such as, for example, a zero load condition. Accordingly, the rating of the switches 54 may be less than the full motor voltage and inrush current ratings as compared to "traditional" motor and inrush rated relays/contactors found in a standard bypass assembly of a motor control device that are each required to have a full motor voltage and higher inrush current ratings (i.e., current rating of several times rated motor current). In embodiments that include optional bypass relay 40 and/or optional output relay s 42, 46, it is contemplated that such relays 40, 46 would be configured with switches similar to switches 54. As described in more detail below, controller 26 controls first and second input relays 32, 36, optional first and second output relays 42, 46 (or optional single output relay) according which of first and second VFDs 30, 34 (or optional bypass 38 (FIG. 2), when included) is actively supplying power to motor 22.

In the illustrated embodiment first and second VFDs 30, 34 are similarly configured with a six-diode rectifier bridge 56 that converts an AC input power into a DC power, a DC link 58 that receives the DC power from the rectifier bridge and includes a positive bus 60 and a negative bus 62, a DC link capacitor bank 64 having one or more capacitors across DC link 58, and optional inductors 48 coupled in series with and on either side of the rectifier bridge 56 on DC link 58 (i.e., a DC choke). VFDs 30, 34 may also include an inverter 66 to convert the DC power to AC power—with the inverter 66 having a series of switch and anti-parallel diode pairs 68 that are controlled by controller 26 via the transmission of gate drive signals to output a specific AC power from motor switching assembly 24 at a specific frequency. Like solid state input contactor 28, the configuration of inverters 66 with switch and anti-parallel diode pairs 68 allows controller 26 to control inverters 66 as overload relays based on overload conditions in power system 10, as measured by various sensors (not shown). In alternative embodiments, the configuration of first and second VFDs 30, 34 may differ from each other in order to provide different functionality for controlling motor 22.

In controlling operation of motor switching assembly 24, controller 26 may control first and second VFDs 30, 34 and their respective first and second input relays 32, 36 in order to alternate which of first and second VFDs 30, 34 is in control of motor 22. The ability of controller 26 to alternate between operating first VFD 30 and second VFD 34 provides redundancy to motor switching assembly 24 and may be used to extend the life of motor switching assembly 24 in comparison to a motor switching assembly with only one VFD. In motor switching assembly 24, controller 26 may alternate between first and second VFDs 30, 34 according to a schedule to balance or extend the overall system lifetime and reliability. Controller 26 may also switch from operating one of first and second VFDs 30, 34 to the other of first and second VFDs 30, 34 in the event that one of first and second VFDs 30, 34 experiences a failure such as, for example, an overvoltage, overcurrent, or short circuit condition. In addition, if one of first and second VFDs 30, 34 is overheating or experiencing another type of stress that may eventually cause a failure, controller 26 may switch to operating the other VFD 30, 34 or may operate both of first and second VFDs 30, 34 in order to share the total load or stress imposed by motor 22. Furthermore, in embodiments in which motor switching assembly 24 includes optional bypass 38, controller 26 may activate or close bypass relay 40 while opening relays 32, 36 in the event that both of first and second VFDs 30, 34 experience a failure for additional security. Methods of alternating between first and second VFDs 30, 34 and optional bypass 38 are discussed further below with respect to FIGS. 6 and 7.

Figure 4:
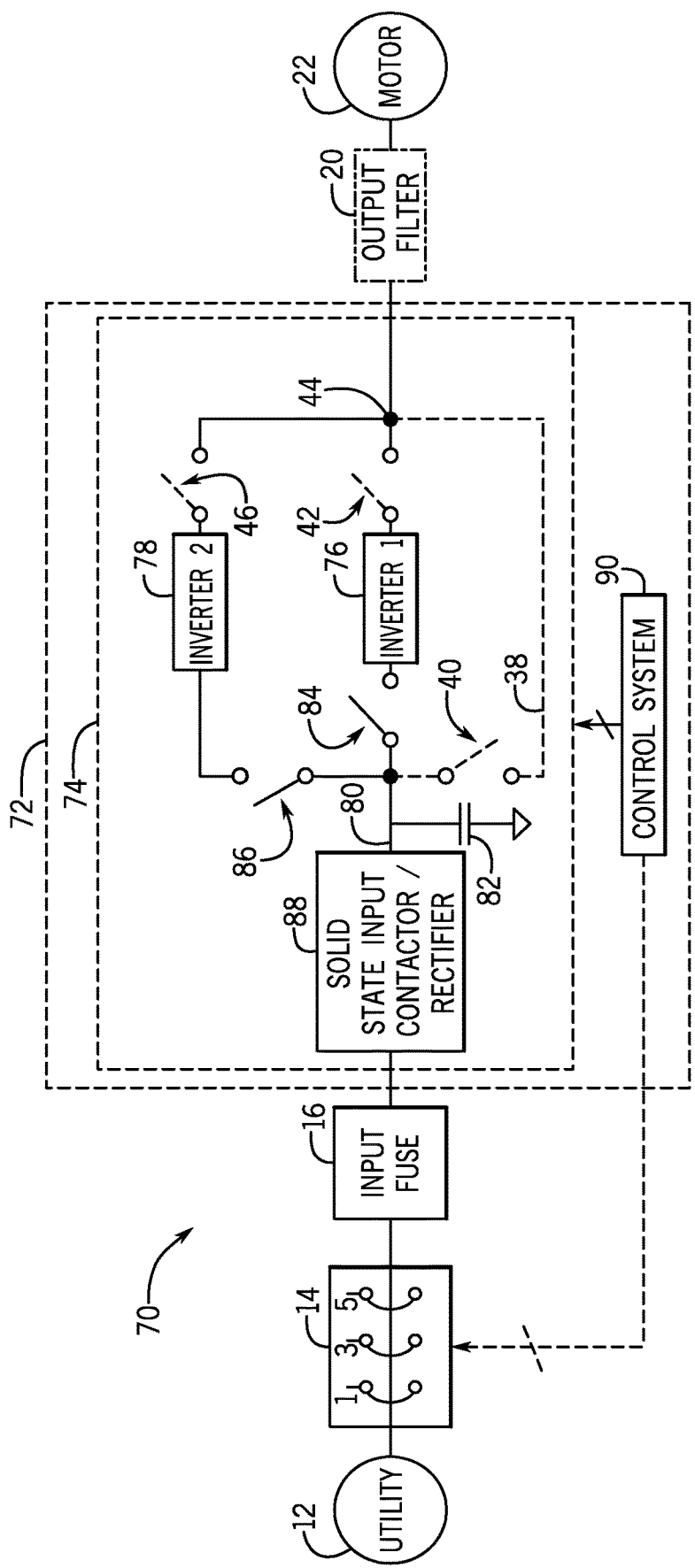
FIG. 4 is a block diagram of a power system including a motor control system having a motor switching assembly with an integrated solid state contactor/rectifier and redundant inverters coupled to a shared DC link, according to an embodiment of the invention.

Referring now to FIG. 4, a block diagram of another embodiment of a power system 70 having a motor control system 72 is shown. Power system 70 is arranged similarly to power system 10 of FIG. 2—and thus like elements therein are numbered identically to corresponding elements in power system 10—except that motor control system 18 in power system 10 is replaced with motor control system 72. Motor control system 72 includes a motor switching assembly or module 74 that is different that motor switching assembly 24 of motor control system 18. Like motor switching assembly 24, motor switching assembly 74 includes a first power converter 76 and a second power converter 78. However, first and second power converters 76, 78 are inverters in power system 70 (shown in FIG. 4 as "Inverter 1" and "Inverter 2," respectively, and hereinafter referred to as "first inverter 76" and "a second inverter 78," respectively) that share a DC link 80 and a DC link capacitor bank 82 having one or more capacitors. DC link capacitor bank 82 is sized to operate only one of first and second inverters 76, 78. In other words, DC link capacitor bank 82 has voltage and current ratings less than the combined full voltage and current ratings of first and second inverters 76, 78. In one non-limiting embodiment, DC link capacitor bank 82 is half the size required to operate both first and second inverters 76, 68 in a traditional manner in which one of the first and second inverters 76, 78 drives the load independently. However, DC link capacitor bank 82 may be sized to operate both of first and second inverters 76, 78 simultaneously according to alternative embodiments.

First inverter 76 is coupled to DC link 80 via a first input relay 84, and second inverter 78 is coupled to DC link 80 via a second input relay 86. Since first and second inverters 76, 78 share a common DC link 80, solid state device 88 of motor switching assembly 74 functions as a rectifier as well as an input contactor. Motor switching assembly 74 also includes a control system or controller 90 for controlling the various switching components of motor switching assembly 74 and optionally disconnect switch 14. Similar to power system 10 of FIG. 2, motor switching assembly 74 may include optional bypass 38 with bypass relay 40, first and second output relays 42, 46, and/or a single output relay (not shown) positioned between node 44 and optional output filter 20.

Figure 5:
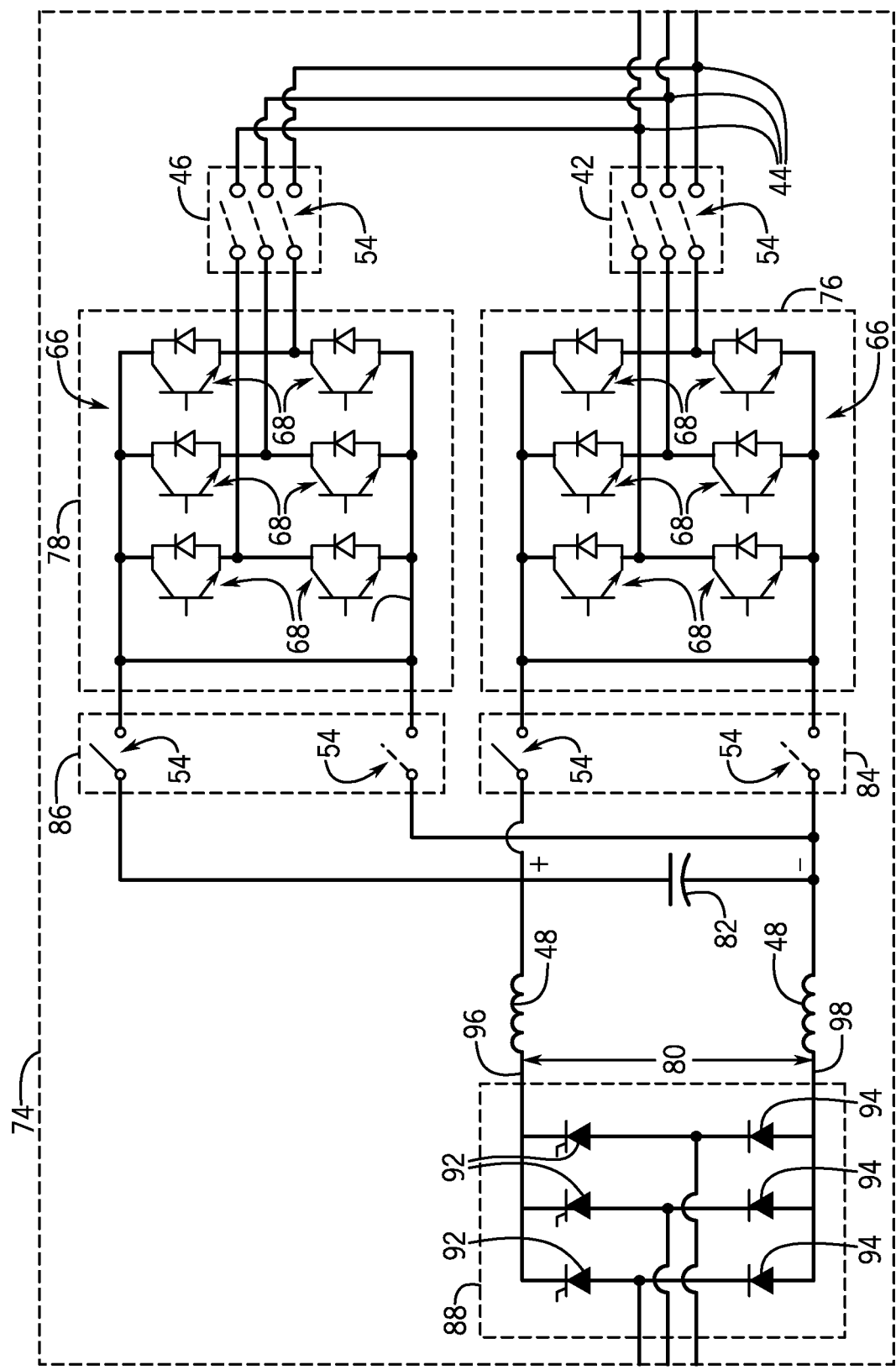
FIG. 5 is a schematic of a motor switching assembly that may be implemented in the motor control system of FIG. 4, according to an embodiment of the invention.

Referring now to FIG. 5, an exemplary structure/configuration of one embodiment of motor switching assembly 74 of FIG. 4 is shown, according to an embodiment of the invention. In the embodiment of FIG. 5, solid state input contactor/rectifier 88 is a half controlled rectifier having three parallel sets of a switch 92 in series with a diode 94. In alternative embodiments, solid state device 88 may be in the form of a fully controlled rectifier in which diodes 94 are replaced with additional switches 92. Switches 92 may be SCRs or thyristors as shown in FIG. 5, or may be provided in the form of another type of solid state switch such as, for example, IGBTs or MOSFETs. Similar to solid state contactor 28 of motor switching assembly 24 (FIG. 3), solid state switches 92 allow solid state device 88 to be controlled by controller 90 to regulate the amount of the line voltage and current present in motor switching assembly 74 to reduce voltage and current stress levels. Further, since controller 90 is able to reliably control each solid state switch 92, controller 90 may be powered by the voltage and current from utility 12 (FIG. 4) rather than a standalone power source. The use of SCRs 92 further allows controller 90 to control solid state contactor 28 as an overload relay based on overvoltage and/or overcurrent conditions present in power system 70 (FIG. 2), as measured by various sensors (not shown). Controller 90 may also operate solid state device 88 as a soft starter in various embodiments such as, for example, embodiments where solid state device 88 is a fully controlled rectifier.

In the three-phase motor switching assembly 74, each of first and second input relays 84, 86 includes one switch 54 on a positive bus 96 of DC link 80. However, switch 54 may be optionally included on a negative bus 98 of DC link 80 either in place of or in addition to switch 54 on positive bus 96. Motor switching assembly 74 may also include optional first and second output relays 42, 46 (or a single output relay downstream of node 44), which would be arranged as in motor switching assembly 24 and would each include three switches 54, one for each phase of the AC power flowing therethrough. As with motor switching assembly 24, switches 54 may only be rated for nominal motor load instead of the full motor load (full motor voltage and inrush current ratings) because controller 90 is able to control the line voltage and current using switches 92 of solid state device 88 such as, for example, when operating solid state device 88 with soft starter functionality.

In the embodiment of FIG. 5, first and second inverters 76, 78 are configured in a similar manner as inverters 66 of motor switching assembly 24. First and second inverters 76, 78 include the same series of switch and anti-parallel diode pairs 68, which are controlled by controller 90 to output a specific AC power from motor switching assembly 74 at a specific frequency. As such, controller 90 may also control inverters 66 as overload relays as indicated above with respect to FIG. 3. In alternative embodiments, first and second inverters 76, 78 may have a different structure than inverters 66 of motor switching assembly 24 and/or structurally differ from one other.

Similar to controller 26 of motor switching assembly 24, controller 90 may alternate between operating first inverter 76 and second inverter 78 in order to provide redundancy and extend the life of motor switching assembly 74. As one example, controller 90 may alternate between operating first inverter 76 and second inverter 78 based on a schedule that balances motor switching assembly 74 and improves the reliability of motor switching assembly 74. As another example, controller 90 may alternate from one of first and second inverters 76, 78 to the other based on a detected failure in one of first and second inverters 76, 78 such as, for example, an overload or short circuit condition. Moreover, controller 90 may be configured to switch between first and second inverters 76, 78 or to operate both of first and second inverters 76, 78 simultaneously to share the load of motor 22 (FIG. 4) if one of first and second inverters 76, 78 is overheating or suffering from another kind of stress. In embodiments including bypass 38, controller 90 may also close bypass relay 40 to bypass both of first and second inverters 76, 78 if both experience a failure.

Figure 6:
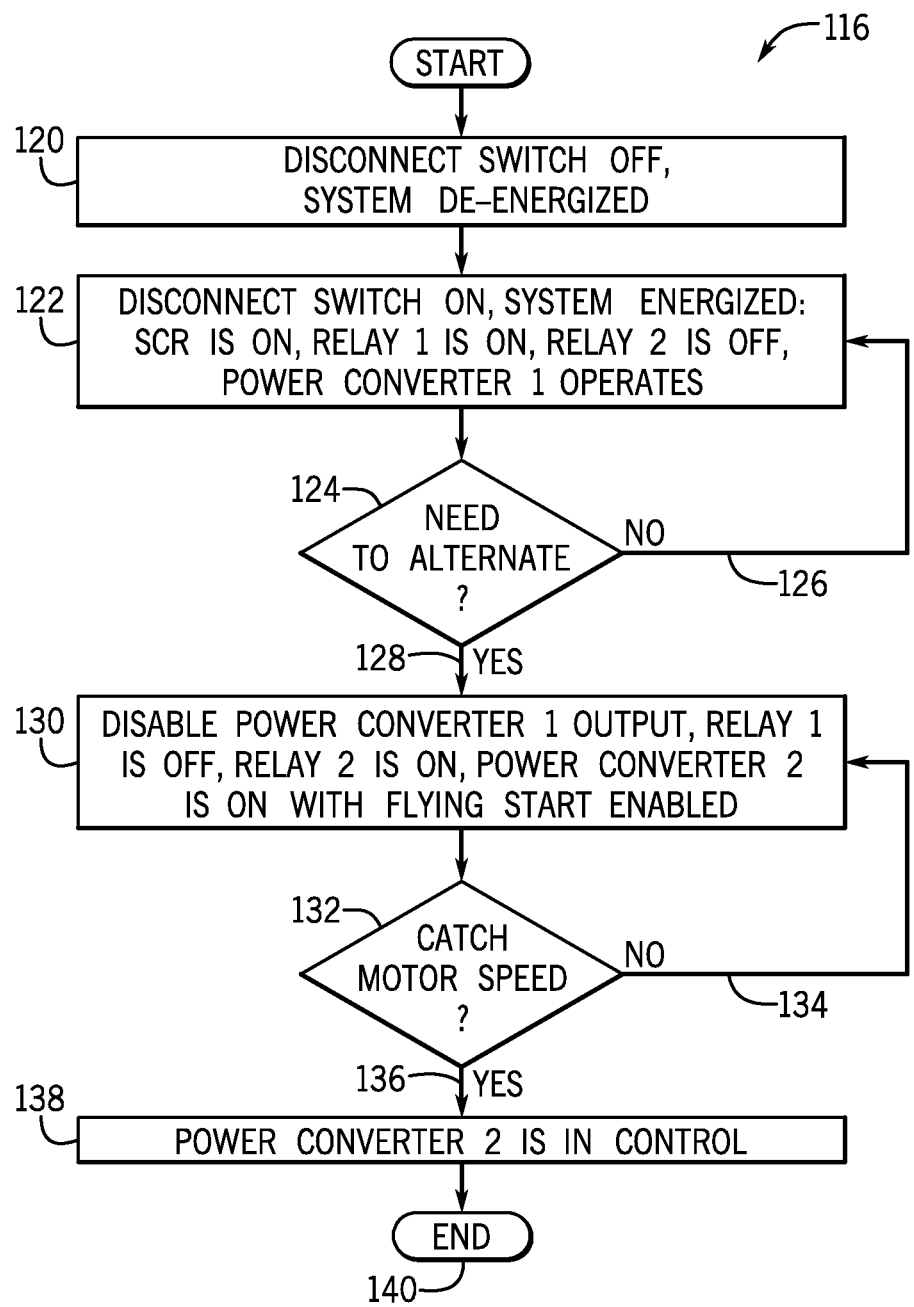
FIG. 6 is a flowchart illustrating a technique for energizing a motor control system and alternating between driving components of the motor control system, such as, for example, the motor control systems of FIGS. 2 and 4, according to an embodiment of the invention.
Figure 7:
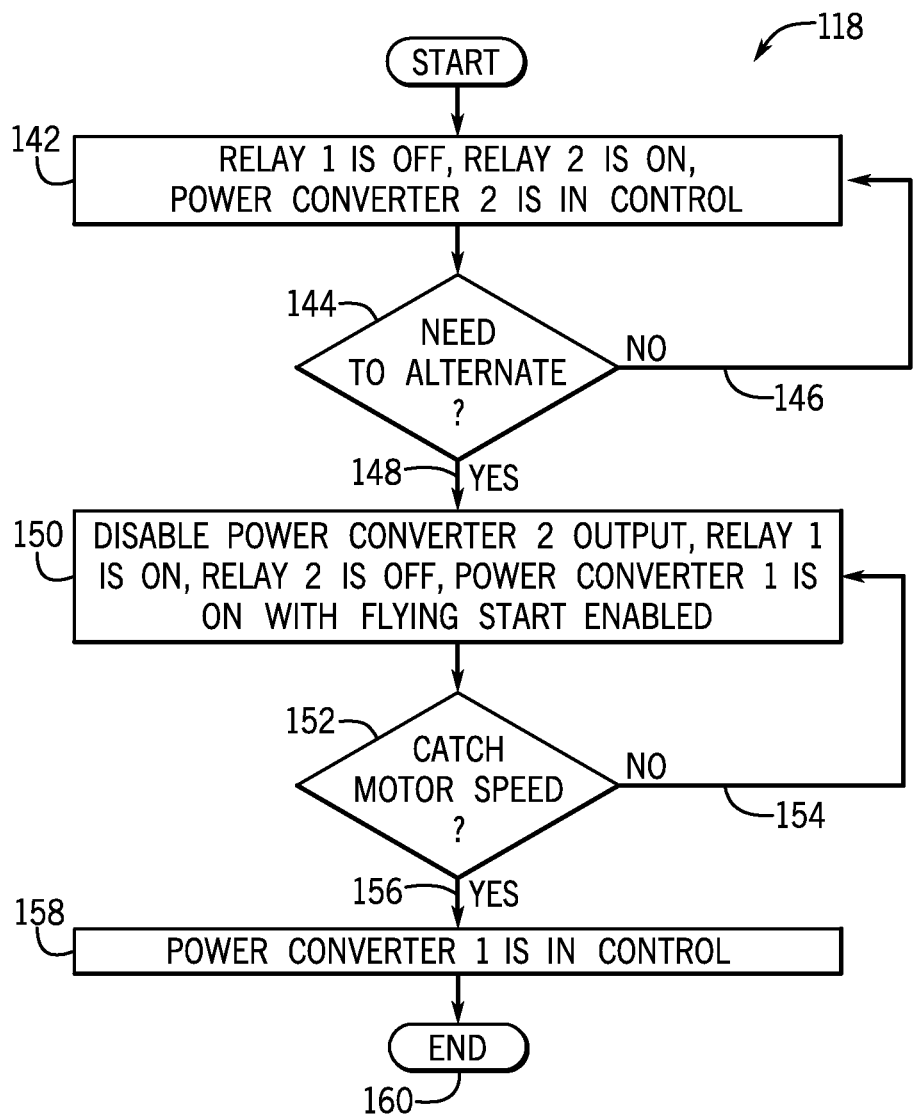
FIG. 7 is a flowchart illustrating a technique for alternating between driving components of an already energized motor control system, such as, for example, the motor control systems of FIGS. 2 and 4, according to an embodiment of the invention.

Referring now to FIGS. 6-7 and with continued reference back to FIGS. 2-5, methods for alternating or transitioning between first and second power converters (e.g., VFDs 30, 34 of the motor switching assembly 24 of FIGS. 2-3 or first and second inverters 76, 78 of the motor switching assembly 74 of FIGS. 4-5) are shown according to embodiments of the invention. First and second methods 116, 118 are described below with respect to components of power system 10 of FIG. 2. However, first and second methods 116, 118 are also applicable to components of power system 70 of FIG. 4. Thus the control sequence of methods 116, 118 will be understood to extend to similarly control first and second inverters 76, 78 of motor switching assembly 74 to operate in the normal and flying start modes using controller 90 in power system 70.

FIG. 6 illustrates a first process or method 116 for transitioning from operating first VFD 30 to operating second VFD 34 to drive motor 22. FIG. 7 illustrates a second process or method 118 for transitioning from operating second VFD 34 to operating first VFD 30 to drive motor 22. First and second methods 116, 118 are generally performed by controller 26, which controls components of motor switching assembly 24 of motor control system 18 and optionally disconnect switch 14 of power system 10.

In controlling operation of motor switching assembly 24 in first and second methods 116, 118, controller 26 controls of SCRs 52 in solid-state contactor 28 via the transmission of gate drive signals thereto. According to an exemplary embodiment, solid-state contactor 28 is operable in a number of distinct modes including a "conducting" or "input" mode or state and a "non-conducting" or "transitional" mode or state, which will be explained in further detail below. Controller 26 also controls switching of each of first and second relays 32, 36 (referred to as "Relay 1" and "Relay 2," respectively, in FIGS. 6-7) and optionally bypass relay 40 and first and second output relays 42, 46 between the On/closed state and the Off/open state described above with respect to FIG. 2, such that current through first and second VFDs 30, 34 can be selectively controlled.

Referring first to FIG. 6, first method 116 starts at STEP 120 where the power system 10 is in a de-energized state due to disconnect switch 14 being in an Off state. That is, power flow from an AC source 12 to the motor control system 18 is cut-off by disconnect switch 14 because disconnect switch 14 in the Off state. At STEP 122, disconnect switch 14 is turned On, such that power flows to motor control system 18 (and motor switching assembly 24) and the system is energized. In this initial stage, controller 26 controls SCRs 52 of solid state contactor 28 in the On state (conducting mode) at STEP 122. As known in the art, the SCRs 52 may be brought into a conducting state either by increasing a voltage across the anode to cathode beyond breakover voltage or by applying a positive pulse at the gate of the SCRs 52. Also at STEP 122, first input relay 32 is switched into the On state, and second input relay 36 is in the Off state. Controller 26 then operates first VFD 30 to drive motor 22. While first method 116 is described as if first VFD 30 is initiated on startup, controller 26 may alternatively elect to operate second VFD 34 or any other VFD included within the system upon startup.

At STEP 124, controller 26 determines whether to cease operation of first VFD 30 to begin operating second VFD 34. According to embodiments of the invention, the controller 26 may make this determination based on a number of inputs and/or criteria. In one embodiment, controller 26 may determine whether to transition to second VFD 34 based upon detecting that first VFD 30 has experienced a fault condition or is otherwise not functioning properly. That is, controller 26 may compare one or more voltage and/or current values measured at first VFD 30 to one or more pre-defined thresholds in order to sense a short circuit or other fault condition in first VFD 30. For example, one or more voltage or current sampling or sensing circuits or sensors (not shown) may measure or determine voltage and/or current at one or more locations in first VFD 30, including current at the switch level of rectifier 56 or inverter 66, current on DC link 58, and/or output currents or voltages from first VFD 30. As one non-limiting example, controller 26 may compare a voltage on DC link 58 to a pre-defined "Overvoltage Condition" to determine if first VFD 30 has malfunctioned. Controller 26 may also make the determination to switch between operating first VFD 30 and second VFD 34 according to a predetermined operation schedule preprogrammed on controller 26 that is designed to extend the life of first and second VFDs 30, 34. In such a case, if the operating time of first VFD 30 has reached or is approaching a time threshold dictated by the predetermined operation schedule, controller 26 may transition operation of motor 22 from first VFD 30 to second VFD 34.

If controller 26 determines at STEP 124 not to transition operation from first VFD 30 to second VFD 34, as indicated at decision line 126, then first method 116 loops back to STEP 122. In doing so, controller 26 continues operating first VFD 30 to drive motor 22. Conversely, if controller 26 determines at STEP 124 to transition from first VFD 30 to second VFD 34, as indicated at decision line 128, then first method 116 continues to STEP 130, where such transitioning is performed.

At STEP 130, controller 26 stops driving first VFD 30 to operate motor 22 and then causes first input relay 32 to move to the Off state. Since controller 26 disables first VFD 30 before opening first input relay 32, first input relay 32 is switched at a zero load condition without any voltage or current stress, which allows first input relay 32 to have a voltage rating that is less than the full motor voltage without any inrush current rating. In addition, SCRs 52 of solid state contactor 28 do not need to be switched to the Off state before switching first input relay 32 if first VFD 30 is disabled. However, controller 26 may optionally first cause SCRs 52 in solid state contactor 28 to switch to the Off (non-conducting) state before switching first input relay 32 from the closed to the open position to ensure that first input relay 32 is switched at a zero load condition. This switching of SCRs 52 to the Off state may be performed by controller 26 in a known manner, such as by causing the gate to turn Off and then shorting out the anode and cathode momentarily, such as with a push-button switch or transistor across the junction.

Upon disabling first VFD 30 and switching first input relay 32 to the Off state, controller 26 switches second input relay 36 from the Off state to the On state and operates second VFD 34. Since second VFD 34 may be controlled to prevent voltage or current stress on second input relay 36 while transitioning between the Off and On states, SCRs 52 of contactor 28 may remain in the On state. However, SCRs 52 of contactor 28 may be in the Off state during this transition to ensure a zero load condition on second input relay 36 as well. In either case, controller 26 switches second input relay 36 at a zero load condition, and second input relay 36 may be implemented with a voltage rating that is less than the full motor voltage without any inrush current rating. If SCRs 52 of contactor 28 are switched Off during the transition of second input relay 36, SCRs 52 would need to be switched back to the On state before controller 26 can operate second VFD 34 to drive motor 22.

Controller 26 initially operates second VFD 34 with a flying start mode enabled. A flying start mode allows control of a motor that is already spinning. When a VFD starts in a normal mode of operation, the VFD initially applies 0 Hz and ramps up to the frequency command. However, starting a VFD in the normal mode with the motor already spinning will generate large currents, which may result in an overcurrent failure. In a flying start mode, controller 26 first identifies the current speed of motor 22 and then begins operating second VFD 34 to synchronize its frequency, amplitude, and phase output with the already spinning motor 22.

At STEP 132, controller 26 determines whether second VFD 34 has caught up or synchronized with the speed of motor 22. If not, as indicated at decision line 134, first method 116 loops back to STEP 130. However, once second VFD 34 is synchronized with motor 22, as indicated at decision line 136, first method 116 moves from STEP 132 to STEP 138 where controller 26 operates second VFD 34 to drive motor 22. Thereafter, first method 116 ends at STEP 140.

Referring now to FIG. 7, method 118 of transitioning between operating VFD 34 to operating VFD 30 starts at STEP 142, where solid state contactor 28 is conducting, first input relay 32 is in the Off state, second input relay 36 is in the On state, and second VFD 34 is in control of motor 22. Disconnect switch 14 is assumed to be in the On state such that power is flowing to motor control system 18 and the system is energized. Controller 26 determines whether to transition from operating second VFD 34 to operate first VFD 30 at STEP 144. Controller 26 may make this determination to transition from VFD 34 to VFD 30 based on any of the same inputs and/or criteria described with respect to first method 116 (e.g., upon detection of a short circuit or fault condition, a predetermined schedule designed to extend the life of VFDs 30, 34, measured voltage and/or current at one or more locations in second VFD 34, etc.).

If controller 26 determines at STEP 144 that alternating to second VFD 34 from first VFD 30 is not needed or desired, as indicated at decision line 146, then second method 118 loops back to STEP 142. In doing so, controller 26 continues operating second VFD 34 to drive motor 22. Conversely, if controller 26 determines at STEP 144 that transitioning from second VFD 34 to first VFD 30 needed or desired, as indicated at decision line 148, then first method 116 continues to STEP 150, where such transitioning is performed.

At STEP 150, controller 26 stops operating second VFD 34 to drive motor 22 and switches second input relay 36 to the Off state. As similarly described above with respect to first method 116, since control disables second VFD 34 before opening second input relay 36, second input relay 36 is switched at a zero load condition with no voltage or current stress such that second input relay 36 may be implemented with a voltage rating that is less than the full motor voltage without any inrush current rating. Disabling second VFD 34 also allows SCRs 52 of solid state contactor 28 to remain On during the switching of second input relay 36. However, controller 26 may cause SCRs 52 in solid state contactor 28 to switch to the Off state before opening second input relay 36 to ensure that second input relay 36 is switched at a zero load condition.

Upon switching second input relay 36 to the Off state and disabling second VFD 34, controller 26, controller 26 switches first input relay 32 to the On state and operates first VFD 30. As controller 26 may control first VFD 30 to prevent voltage or current stress on first input relay 32 while moving from the On state to the Off state, SCRs 52 of contactor 28 may stay in the On state. Alternatively, controller 26 may switch SCRs 52 to the Off state while switching first input relay 32 in order to ensure a zero load condition on first input relay 32. In both cases, controller 26 switches first input relay 32 at a zero load condition so that first input relay 32 may have a voltage rating that is less than the full motor voltage without any inrush current rating. If controller 26 does control SCRs 52 of contactor 28 in an Off state while switching first input relay 32, controller 26 must switch SCRs 52 back to the On state so that first VFD 30 can drive motor 22.

Controller 26 initially operates first VFD 30 with the flying start mode enabled and identifies the speed of motor 22 and begins operating first VFD 30 to synchronize its frequency, amplitude, and phase output with the already spinning motor 22. At STEP 152, controller 26 determines whether first VFD 30 has caught up to speed or synchronized with the speed of motor 22. If not, as indicated at decision line 154, second method 118 loops back to STEP 150. However, once first VFD 30 is synchronized with motor 22, as indicated at decision line 156, second method 118 moves from STEP 152 to STEP 158 where controller 26 operates first VFD 30 to drive motor 22. Thereafter, second method 118 ends at STEP 160.

While second method 118 is described above as being initiated when second VFD 34 is in control of motor 22, second method 118 may also be utilized in operating circumstances when first VFD 30 is in control of motor 22 and a transition to second VFD 34 may be necessary. In other words, second method 118 may be utilized to start any of the VFDs included within the power system either from standstill or using a flying start.

If optional bypass 38 and bypass relay 40 are included in motor switching assembly 24, controller 26 may also make a determination whether to transition to enabling bypass 38 to drive motor 22. Controller 26 makes this determination if, for example, both first and second VFDs 30, 34 have experienced a fault condition or if an operator has indicated that motor 22 should operate in a steady state. Further, if optional first and second output relays 42, 46 are included in motor switching assembly 24, optional first and second output relays 42, 46 may be controlled to operate in conjunction with first and second input relays 32, 36, with first input and output relays 32, 42 being operated in the same state and second input and output relays 36, 46 likewise being operated in the same state. Alternatively, optional first and second output relays 42, 46 may be controlled to operate in the Off state only in the event that either of first and second VFDs 30, 34, respectively, experiences a fault and needs to be isolated.

In addition to the above-described VFD alternating methods 116, 118, controller 26 may also control first and second VFDs 30, 34 to operate simultaneously under certain conditions. As a non-limiting example, if first VFD 30 is driving motor 22 and begins to experience or approach a threshold value of stress, such as, for example, a temperature threshold, controller 26 may determine that second VFD 34 should be operated with first VFD 30 to share the load of motor 22 instead of switching to operating second VFD 34 alone. Operating first and second VFDs 30, 34 simultaneously may be effective to reduce the overall stress on motor switching assembly 24 in addition to the stress on first VFD 30.

In addition to the above-described functional benefits that stem from incorporating redundant power structures in a power system, the use of redundant power structures provides the opportunity to leverage additional benefits at the system level when the components of the motor switching assembly 24 are provided as a board-level circuit, with the assembly including components that are mounted to or formed directly on a printed circuit board (PCB). Constructing motor switching assembly 24 as a board-level circuit provides a compact system that may be housed within a compact plastic enclosure (not shown) as opposed to a large metal cabinet.

Figure 8:
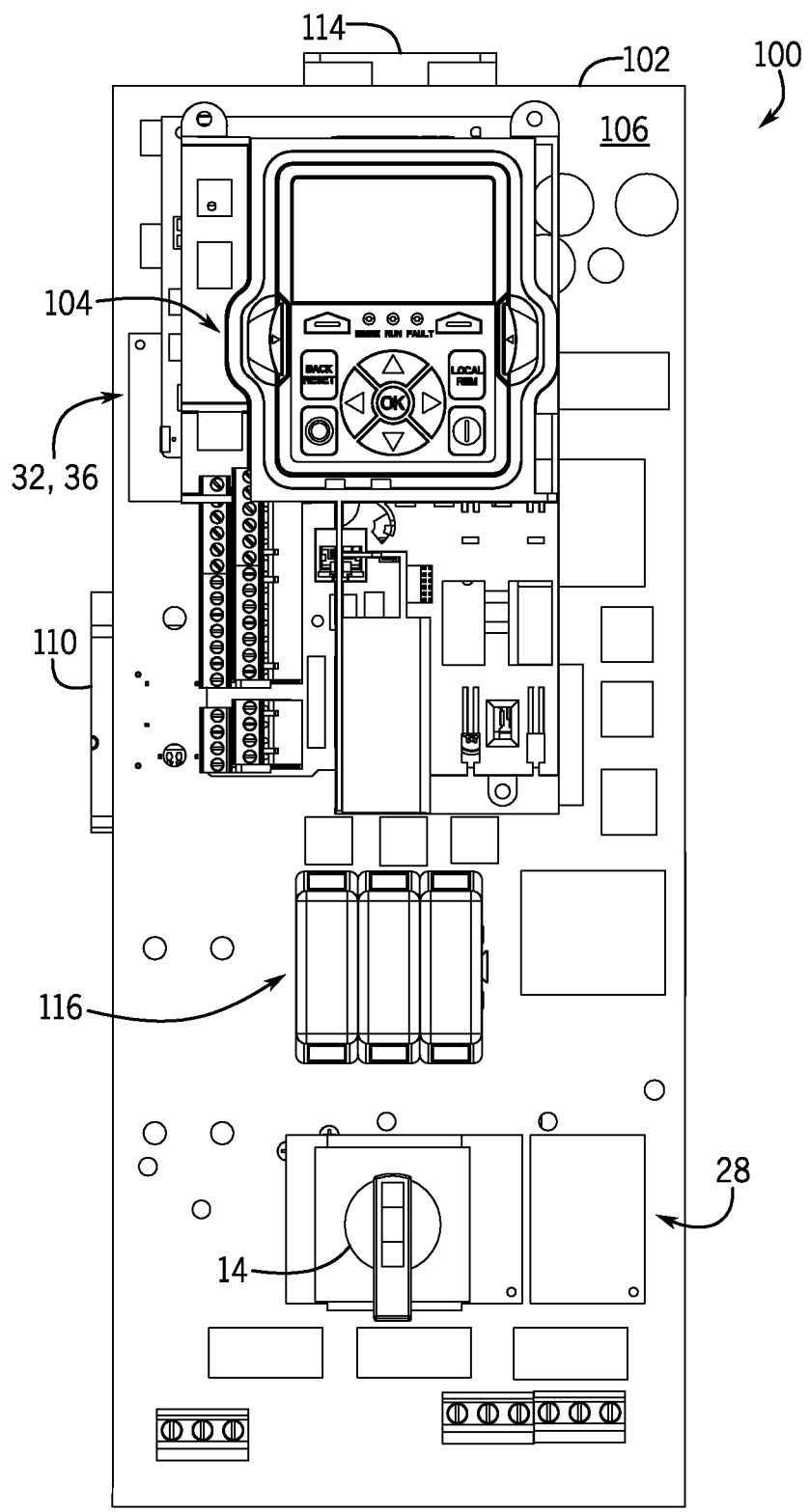
FIG. 8 is a front view of a motor control and protection assembly including a motor control system, such as for example, the motor control systems of FIGS. 2 and 4, coupled to a printed circuit board (PCB), according to an embodiment of the invention.
Figure 9:
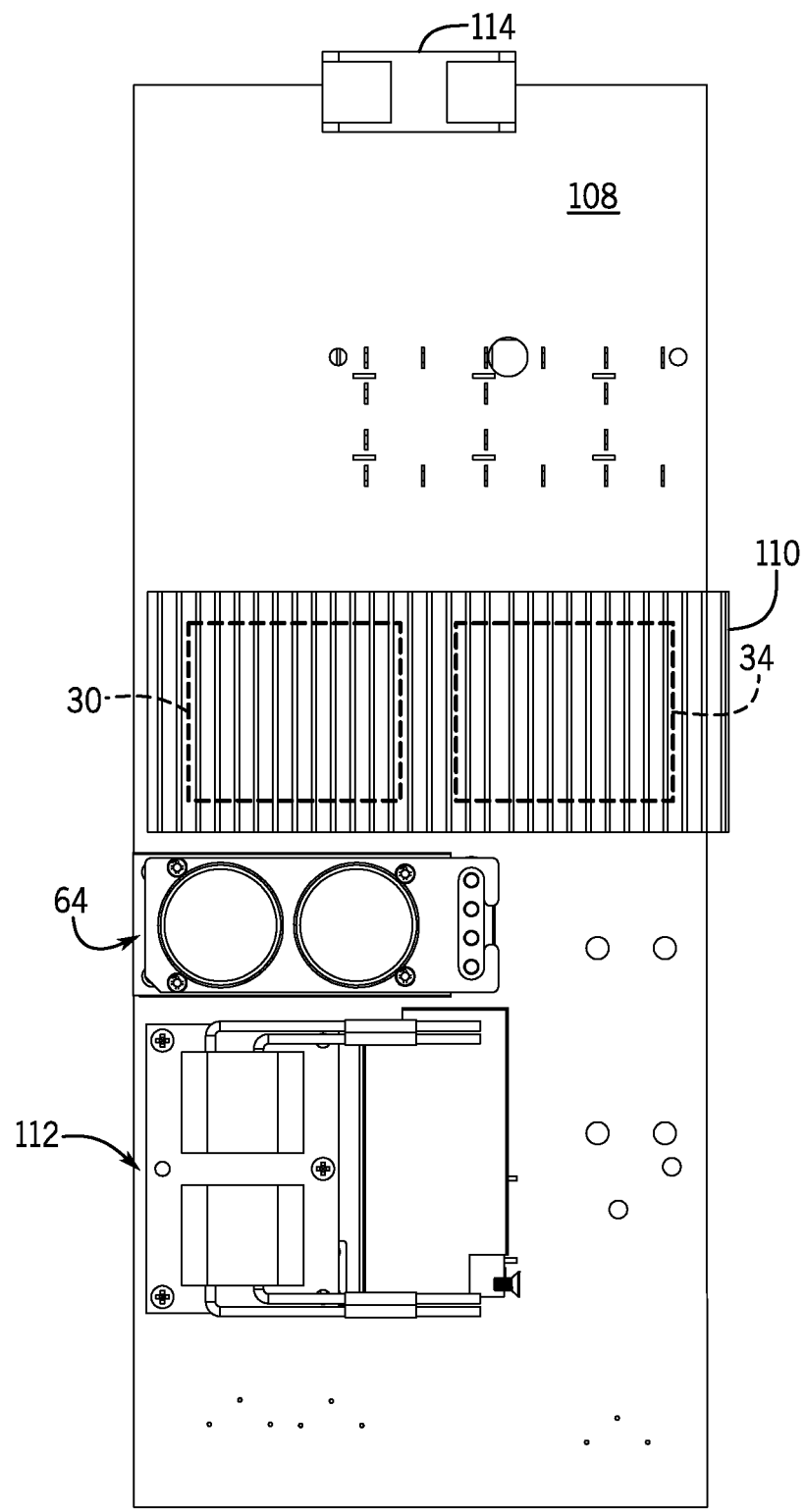
FIG. 9 is a rear view of the motor control and protection assembly of FIG. 8, according to an embodiment of the invention.
Figure 10:
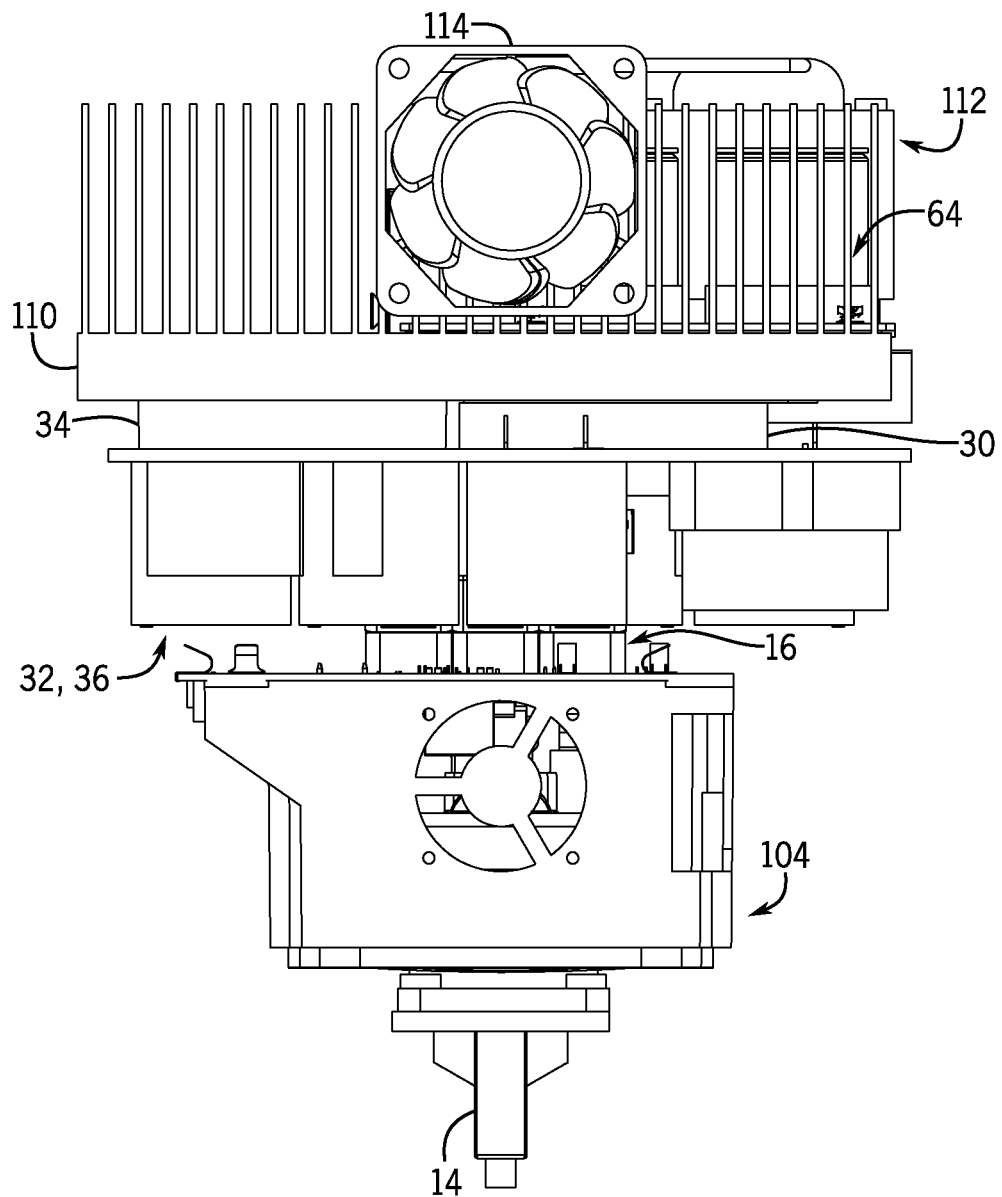
FIG. 10 is a top view the motor control and protection assembly of FIG. 8, according to an embodiment of the invention.

Referring now to FIGS. 8-10, front, back, and top views of a motor control and protection assembly or module 100 coupled to a PCB 102 are shown, according to an embodiment of the invention. Motor control and protection module 100 is described herein as including some of the same components as power system 10 of FIG. 2—and thus like elements therein are numbered identically to corresponding elements in power system 10. However, it is to be understood that the configuration of motor control and protection module 100 in FIGS. 8-10 is just one exemplary configuration of many different possible configurations. The plurality of components included in motor switching assembly 24 are mounted to or formed directly on PCB 102.

PCB 102 may be of a standard or customized construction and may be formed of an insulating substrate with a plurality of traces or leads (not shown) thereon that provide electrical connection paths between the components on the substrate. The coupling of components to PCB 102 may be accomplished by any of a number of appropriate means including plug-and-play type components that snap onto PCB 102 and/or components that are permanently soldered to PCB 102. The components may be electrically connected to PCB 102 via contact pads on PCB 102 that mate with or are soldered to corresponding pads on the respective components, and electrical connections and communications between the components (and controller 26) may be provided via the traces formed on PCB 102. This mounting of components directly onto PCB 102 and use of electrical traces to form connections between components results in a board-level motor switching assembly 24 having fewer terminal connections and cables such that voltage losses in motor switching assembly 24 are reduced and efficiency of motor switching assembly 24 is improved. In alternative embodiments, motor switching assembly 24 may be provided with multiple PCB substrates, each having a select subset of components coupled thereto.

Referring to FIG. 8, input fuse 16, solid state contactor 28, first and second input relays 32, 34 (shown more clearly in FIG. 8), and an optional user interface 104 are coupled to a first surface 106 of PCB 102. Optional user interface 104 is visible through the plastic enclosure around power system 100 such that a user can change various settings for motor control and protection module 100. In FIG. 6, controller 26 is housed within optional user interface 104 that permits a user to adjust control settings of controller 26. First and second input relays 32, 36 are also coupled to first surface 106 of PCB 102, as shown in FIG. 8. In addition, optional bypass relay 40 and optional first and second output relays 42, 46 or single output relay 48 may be coupled to first surface 106 of PCB 102.

Referring to FIG. 7, first and second VFDs 30, 34 are coupled to a second surface 108 of PCB 102. A common or shared heat sink 110 is mounted across both VFDs 30, 34. Since only one of first and second VFDs 30, 34 is operating at one time or first and second VFDs 30, 34 are operating simultaneously to share the load, shared heat sink 110 may be thermally sized to manage the heat produced by one of VFDs 30, 34, thereby reducing the size and cost of heat sink 110. In other words, heat sink 110 is thermally sized to manage an amount of heat generated by either of the first and second VFDs 30, 34 operating individually and at full load. However, in alternative embodiments, first and second VFDs 30, 34 are each provided with a discrete heat sink. DC link capacitor banks 64 for first and second VFDs 30, 34 are also coupled to second surface 108 with an optional DC choke and electromagnetic interference (EMI) filtering module 112. A fan 114 is positioned to direct an air flow toward heat sink 110. This arrangement of VFDs 30, 34 on PCB 102 thus permits the two VFDs 30, 34 to share a common heat sink 110, fan 114, and cooling scheme.

Beneficially, embodiments of the invention thus provide a motor control system and method of operation thereof that enable more advanced controls in the motor control system, including power flow control and protection, while also reducing the number of discrete components included within the motor control system (e.g., removing discrete contactors and soft-starters of a bypass assembly). Integration of a multi-functional solid-state contactor and relays into a board level motor switching assembly provides electrical isolation and enables transitioning between redundant motor driving components such as, for example, first and second VFDs or first and second inverters. The solid state contactor and relays provide for routing power to the motor driving components and transitioning between states under a zero load condition. Transitioning between the motor driving components allows for a more reliable system that still has full functionality if one of the motor driving components experiences a fault or a failure. Further, providing redundant motor driving components as part of a board level motor switching assembly facilitates the use of a shared heat sink and has the additional benefits of reduced cable losses, fewer terminal connections, and provides for a more efficient motor control system.

According to one embodiment of the present invention, a motor control system for selectively controlling power from a power source to a load includes a motor switching assembly having a solid state contactor with a plurality of solid state switches. The motor switching assembly also includes at least one DC link coupled to the solid state contactor and first and second inverters coupled to the at least one DC link. The motor switching assembly further includes a first relay coupled between the solid state contactor and an input of the first inverter and a second relay coupled between the solid state contactor and an input of the second inverter. In addition, the motor control system includes a control system programmed to control the motor switching assembly to selectively supply power to the load from the power source.

According to another embodiment of the present invention, a controller-implemented method of operating a motor control system having a solid state contactor, at least one DC link coupled to the solid state contactor, first and second power converters coupled to the at least one DC link, and first and second relays coupled between the solid state contactor and respective first and second power converters includes controlling the solid state contactor in a conducting mode. The method additionally includes closing the first relay to supply power to the first power converter and operating the first power converter to drive a motor. The method further includes transitioning from operating the first power converter to operating the second power converter by disabling the first power converter, opening the first relay, closing the second relay, and operating the second power converter to drive the motor.

According to yet another embodiment of the present invention, a motor switching assembly includes a first power converter, a second power converter coupled in parallel with the first power converter, and a solid state contactor positioned upstream from the first and second power converters. The motor switching assembly also includes a first relay positioned between the solid state contactor and the first power converter and a second relay positioned between the solid state contactor and the second power converter.

The present invention has been described in terms of the preferred embodiment, and it is recognized that equivalents, alternatives, and modifications, aside from those expressly stated, are possible and within the scope of the appending claims.

What is claimed is:

1. A motor control system for selectively controlling power from a power source to a load, the motor control system comprising:
   a motor switching assembly comprising:
      a solid state contactor comprising a plurality of solid state switches;
      at least one direct current (DC) link coupled to the solid state contactor;
      a first inverter coupled to the at least one DC link;
      a first relay coupled between the solid state contactor and an input of the first inverter;
      a second inverter coupled to the at least one DC link; and
      a second relay coupled between the solid state contactor and an input of the second inverter;
      wherein the first inverter and the first relay are coupled in parallel with the second inverter and the second relay between an output of the solid state contactor and an output node; and
   a control system programmed to control the motor switching assembly to selectively supply power to the load from the power source.

2. The motor control system of claim 1 further comprising:
   a first rectifier coupled between the first relay and the first inverter; and
   a second rectifier coupled between the second relay and the second inverter;
   wherein the at least one DC link comprises:
      a first DC link coupled between the first rectifier and the input of the first inverter such that the first rectifier, first DC link, and first inverter form a first variable frequency drive (VFD); and
      a second DC link coupled between the second rectifier and the input of the second inverter such that the second rectifier, second DC link, and second inverter form a second VFD.

3. The motor control system of claim 1 wherein the solid state contactor comprises three pairs of anti-parallel switches.

4. The motor control system of claim 1 wherein the at least one DC link comprises a single DC link coupled between the solid state contactor and the first relay and between the solid state contactor and the second relay.

5. The motor control system of claim 1 wherein the solid state contactor comprises a half controlled rectifier including three parallel sets of a silicon-controlled rectifier (SCR) in series with a diode.

6. The motor control system of claim 1 further comprising:
   a third relay coupled to an output of the first inverter; and
   a fourth relay coupled to an output of the second inverter.

7. The motor control system of claim 1 wherein the motor switching assembly comprises a board-level assembly where the solid state contactor, the first and second relays, and the first and second inverters are mounted to or formed on a printed circuit board (PCB).

8. The motor control system of claim 1 further comprising a common heat sink coupled to the first and second inverters, wherein the common heat sink is thermally sized to manage an amount of heat generated by one of the first and second inverters operating at full load.

9. The motor control system of claim 1 wherein the first inverter and the second inverter are coupled to a common DC link capacitor bank; and
   wherein the common DC link capacitor bank is half the size required to operate one of the first and second inverters to drive the load independently.

10. A controller-implemented method of operating a motor control system having a solid state contactor, at least one direct current (DC) link coupled to the solid state contactor, first and second power converters coupled to the at least one DC link, and first and second relays coupled between the solid state contactor and respective first and second power converters, the method comprising:
    controlling the solid state contactor in a conducting mode;
    closing the first relay to supply power to the first power converter;
    operating the first power converter to drive a motor;
    transitioning from operating the first power converter to operating the second power converter by:
       disabling the first power converter;
       opening the first relay;
       closing the second relay; and
       operating the second power converter to drive the motor.

11. The method of claim 10 wherein transitioning from operating the first power converter to operating the second power converter further comprises:
    identifying a current speed of the motor;
    controlling the second power converter according to a flying start mode to synchronize with the current speed of the motor;
    determining whether the second power converter is synchronized with the current speed of the motor;
    if the second power converter is not synchronized with the current speed of the motor, controlling the second power converter to continue in the flying start mode; and
    if the second power converter is synchronized with the current speed of the motor, operating the second power converter to drive the motor.

12. The method of claim 10 further comprising determining whether to transition from operating the first power converter to operating the second power converter by determining at least one of:
    a temperature of the first power converter;
    a detected failure of the first power converter; and
    an elapsed operating duration of the first power converter.

13. The method of claim 10 further comprising:
    closing each of the first and second relays; and
    operating the first and second power converters simultaneously to share the load imposed by the motor.

14. The method of claim 13 further comprising:
    monitoring an operating temperature of the first power converter; and
    operating the first and second power converters simultaneously if the monitored operating temperature of the first power converter has reached or exceeded a temperature threshold.

15. A motor switching assembly comprising:
    a first power converter;
    a second power converter coupled in parallel with the first power converter;
    a solid state contactor positioned upstream from the first and second power converters;
    a first relay positioned between an output of the solid state contactor and the first power converter; and a second relay coupled in parallel with the first relay and positioned between the output of the solid state contactor and the second power converter.

16. The motor switching assembly of claim 15 wherein the solid state contactor comprises a plurality of solid state switches.

17. The motor switching assembly of claim 15 wherein the first and second power converters comprise variable frequency drives (VFDs).

18. The motor switching assembly of claim 15 wherein the first and second power converters comprise inverters.

19. The motor switching assembly of claim 18 wherein the inverters are coupled to a common DC link.

20. The motor switching assembly of claim 15 wherein the first and second power converters are positioned adjacent one another on a printed circuit board (PCB) and share a common heat sink.

21. The motor switching assembly of claim 16 wherein the plurality of solid state switches comprises a plurality of pairs of anti-parallel switches.

* * * * *